United States Patent
Yang et al.

(10) Patent No.: US 12,553,821 B2
(45) Date of Patent: Feb. 17, 2026

(54) SMOKE DETECTION DEVICE AND SMOKE COLLECTOR

(71) Applicant: PixArt Imaging Inc., Hsin-Chu (TW)

(72) Inventors: Cheng-Lin Yang, Hsin-Chu (TW);
Zhi-Hao Wu, Hsin-Chu (TW);
Yen-Chang Chu, Hsin-Chu (TW);
Hung-Yu Lai, Hsin-Chu (TW);
Chih-Ming Sun, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 125 days.

(21) Appl. No.: 18/764,101

(22) Filed: Jul. 3, 2024

(65) Prior Publication Data
US 2026/0009721 A1    Jan. 8, 2026

(51) Int. Cl.
*G01N 21/03* (2006.01)
*G01N 21/05* (2006.01)
*G01N 21/53* (2006.01)

(52) U.S. Cl.
CPC ......... *G01N 21/0303* (2013.01); *G01N 21/05* (2013.01); *G01N 21/53* (2013.01); *G01N 2021/052* (2013.01)

(58) Field of Classification Search
CPC .... G01N 21/0303; G01N 21/05; G01N 21/53; G01N 2021/052; G01N 2015/0046; G01N 33/0009; G08B 17/10
See application file for complete search history.

(56) References Cited

U.S. PATENT DOCUMENTS

| | | | |
|---|---|---|---|
| 10,809,173 B2 | 10/2020 | Deliwala | |
| 2022/0268681 A1* | 8/2022 | Eichmann | G08B 17/113 |
| 2022/0268682 A1* | 8/2022 | Chu | G08B 17/107 |

FOREIGN PATENT DOCUMENTS

| | | | | |
|---|---|---|---|---|
| CN | 111080960 A | * | 4/2020 | G08B 17/107 |
| DE | 102019219200 A1 | * | 6/2021 | G08B 17/107 |

\* cited by examiner

*Primary Examiner* — Tarifur R Chowdhury
*Assistant Examiner* — Kaitlyn E Kidwell
(74) *Attorney, Agent, or Firm* — Winston Hsu (57) ABSTRACT

A smoke detection device includes a circuit board, an illumination light source, an optical detector and a smoke collector. The illumination light source is disposed on the circuit board and adapted to emit an illumination beam. The optical detector is disposed adjacent to the illumination light source and adapted to receive the illumination beam. The smoke collector is disposed on the circuit board to cover the illumination light source and the optical detector. The smoke collector includes a shelter, a lateral portion and a base portion. The base portion includes a plurality of protruding structures and a plurality of sunken structures alternately disposed adjacent to each other. Each of the plurality of protruding structures and a corresponding sunken structure are adapted to reflect a part of the illumination beam away from the optical detector and keeping a specific part of the illumination beam being received by the optical detector.

20 Claims, 12 Drawing Sheets

SMOKE DETECTION DEVICE AND SMOKE COLLECTOR

BACKGROUND OF THE INVENTION

1. Field of the Invention

The present invention relates to a smoke detection device and a smoke collector, and more particularly, to a smoke detection device and a smoke collector of decreasing optical noise and increasing detection quality.

2. Description of the Prior Art

A conventional smoke detection device includes a smoke collector, a circuit board, an illumination light source and an optical detector. The illumination light source and the optical detector are disposed on the circuit board. The smoke collector is assembled with the circuit board to cover the illumination light source and the optical detector. When gaseous matter flows into the smoke collector, an illumination beam emitted by the illumination light source is projected onto the gaseous matter. The optical detector receives and analyzes the illumination beam scattered from the gaseous matter to decide concentration of the gaseous matter. The conventional smoke detection device may dispose a classic cone reflection structure inside the smoke collector. The illumination beam emitted by the illumination light source is reflected by the classic cone reflection structure in a direction away from the optical detector, so as to prevent the illumination beam passing through the gaseous matter from being reflected by the classic cone reflection structure towards the optical detector, and therefore to decrease the reflected light amount of the optical detector. However, the optical smoke detection device is easily affected by ambient light; the conventional smoke detection device may suppress background light intensity by utilizing the classic cone reflection structure to decrease the light received amount of the optical detector, but accordingly a detection result of the optical detector is more likely to have a larger noise ratio due to intensity of the ambient light being greater than the reflected amount of the illumination beam.

SUMMARY OF THE INVENTION

The present invention provides a smoke detection device and a smoke collector of decreasing optical noise and increasing detection quality for solving above drawbacks.

According to the claimed invention, a smoke detection device includes a circuit board, an illumination light source, an optical detector and a smoke collector. The illumination light source is disposed on the circuit board and adapted to emit an illumination beam. The optical detector is disposed adjacent to the illumination light source and adapted to receive the illumination beam. The smoke collector is disposed on the circuit board to cover the illumination light source and the optical detector. The smoke collector includes a shelter, a lateral portion and a base portion. The lateral portion is disposed on an edge of the shelter. The base portion is disposed on the shelter and surrounded by the lateral portion to form a collection chamber. The base portion includes a plurality of protruding structures and a plurality of sunken structures alternately disposed adjacent to each other. Each of the plurality of protruding structures and a corresponding sunken structure are adapted to control a reflection direction of the illumination beam, for reflecting a part of the illumination beam away from the optical detector, and keeping a specific part of the illumination beam being received by the optical detector.

According to the claimed invention, the base portion further comprises a central region and an outer region, the outer region is disposed around the central region, a center structural height of the central region is greater an edge structural height of the central region, and a minimal structural height of the central region relative to the shelter is the same as a maximal structural height of the outer region relative to the shelter.

According to the claimed invention, each protruding structure comprises a first end and a second end opposite to each other, the first end is located inside the central region, the second end is located inside the outer region, a first structural height of the first end relative to the shelter is greater than a second structural height of the second end relative to the shelter.

According to the claimed invention, each sunken structure comprises a first end and a second end opposite to each other and a reflection surface, the reflection surface is extended from the first end to the second end, a section of the reflection surface related to the second end contacts the shelter or is distant from the shelter. The reflection surface is an arc surface, or two flat surfaces bent to each other.

According to the claimed invention, a connection surface between the protruding structure and the corresponding sunken structure is a flat surface, an arc surface, or two flat surfaces bent to each other. The base portion is a circular structure. The lateral portion comprises a plurality of guiding elements disposed around the base portion in a spaced manner. The plurality of guiding elements is a wing-shaped structure. The plurality of guiding elements is disposed on the shelter, or is extended from the shelter to the base portion.

According to the claimed invention, a smoke collector is applied to a smoke detection device. The smoke collector includes a shelter, a lateral portion and a base portion. The lateral portion is disposed on an edge of the shelter. The base portion is disposed on the shelter and surrounded by the lateral portion to form a collection chamber. The base portion includes a plurality of protruding structures and a plurality of sunken structures alternately disposed adjacent to each other. Each of the plurality of protruding structures and a corresponding sunken structure are adapted to control a reflection direction of the illumination beam, for reflecting a part of the illumination beam away from the optical detector and keeping a specific part of the illumination beam being received by the optical detector.

The smoke detection device of the present invention can design the guiding element into the streamlined wing-shaped structure for increasing the flow of the gaseous matter in and out of the smoke collector; the smoke detection device can further dispose the base portion similar to the close-loop structure stitched by the multiple valley-shaped features on the shelter of the smoke collector, and the base portion can have the protruding structures and the sunken structures alternately and symmetrically disposed adjacent to each other that can control the reflection direction of the illumination beam emitted by the illumination light source; for example, some part of the illumination beam can be reflected in the direction away from the optical detector to be out of the smoke collector, and a specific part of the illumination beam may be stilled received by the optical detector. The connection surface between the protruding structure and the corresponding sunken structure can be indicated as the reflection surface of the base portion. The present invention define the surface structural feature, the extended length and/or the extended angle of the reflection surface to accurately control a reflection amount of the illumination beam in different reflection directions. The smoke detection device of the present invention can allow the optical detector to receive the illumination beam with higher intensity scattered from the gaseous matter without influence of reflected light from the base portion inside the smoke collector; even though the optical detector detects the ambient light, a detection result of the optical detector is slightly effected by the ambient light because the scattered illumination beam is larger than the ambient light, and the optical detector can still provide the preferred detection accuracy.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
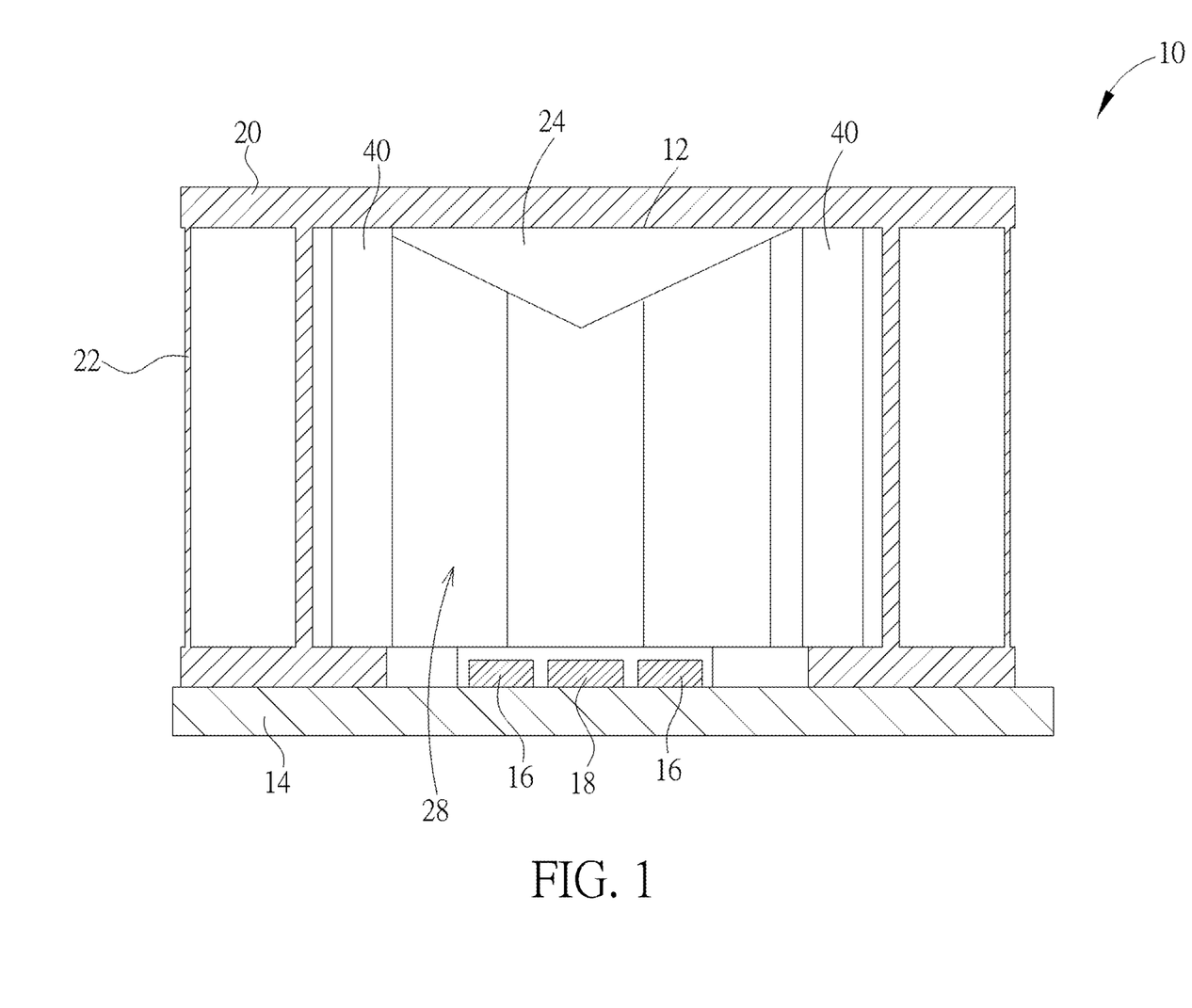
FIG. 1 is a structurally sectional view of a smoke detection device according to an embodiment of the present invention.
Figure 2:
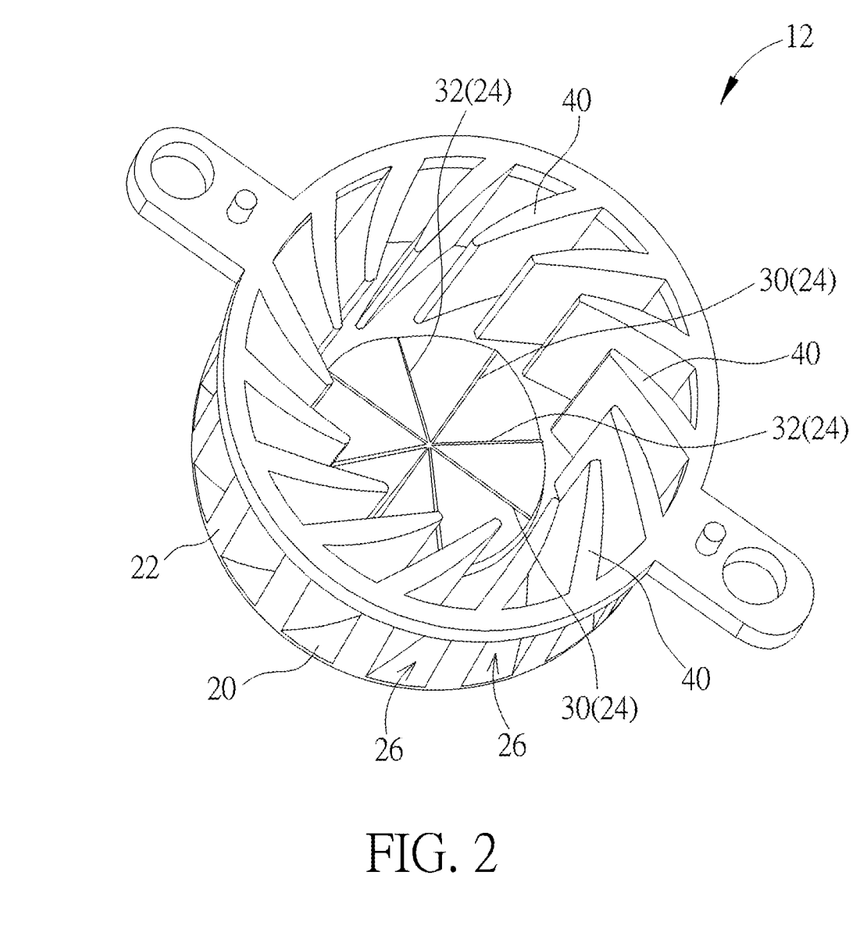
FIG. 2 is an appearance diagram of a smoke collector according to the embodiment of the present invention.

Please refer to FIG. 1 and FIG. 2. FIG. 1 is a structurally sectional view of a smoke detection device 10 according to an embodiment of the present invention. FIG. 2 is an appearance diagram of a smoke collector 12 according to the embodiment of the present invention. The smoke detection device 10 can include a smoke collector 12, a circuit board 14, an illumination light source 16 and an optical detector 18. The illumination light source 16 and the optical detector 18 can be disposed on the circuit board 14 and adjacent to each other. The smoke collector 12 can be disposed on the circuit board 14 in a detachable manner for covering the illumination light source 16 and the optical detector 18. Gaseous matter can flow into and out of the smoke collector 12 in any directions. The illumination light source 16 can emit an illumination beam towards the smoke inside the smoke collector 12. The optical detector 18 can receive the illumination beam scattered from the gaseous matter inside the smoke collector 12, and analyze the reflected illumination beam to decide whether to output a warning reminder. A number and position of the illumination light source 16 and the optical detector 18 are not limited to the embodiment shown in FIG. 1, and depends on a design demand.

The smoke collector 12 can include a shelter 20, a lateral portion 22 and a base portion 24. The lateral portion 22 can be disposed on an edge of the shelter 20, and have a plurality of openings 26. The base portion 24 can be disposed on a middle of the shelter 20, and be surrounded by the lateral portion 22 to form a collection chamber 28. The base portion 24 may be designed as a circular structure, and practical application of the base portion 24 is not limited to the foresaid embodiment; for example, the base portion 24 can be a rectangular structure and any polygonal structure. The openings 26 can be communicated with the collection chamber 28, and the gaseous matter can flow into and out of the collection chamber 28 of the smoke collector 12 through the openings 26. The smoke collector 12 can include a plurality of protruding structures 30 and a plurality of sunken structures 32 alternately disposed on the base portion 24 adjacent to each other. The protruding structure 30 and the sunken structure 32 can have optical reflection functions, and be used to control a reflection direction of the illumination beam and further to prevent the illumination beam from completely diverging towards the surroundings. In other possible embodiment, a surface of the base portion 24 can have light absorption material used to decrease possibility of the illumination beam accidently entering the optical detector 18.

Figure 3:
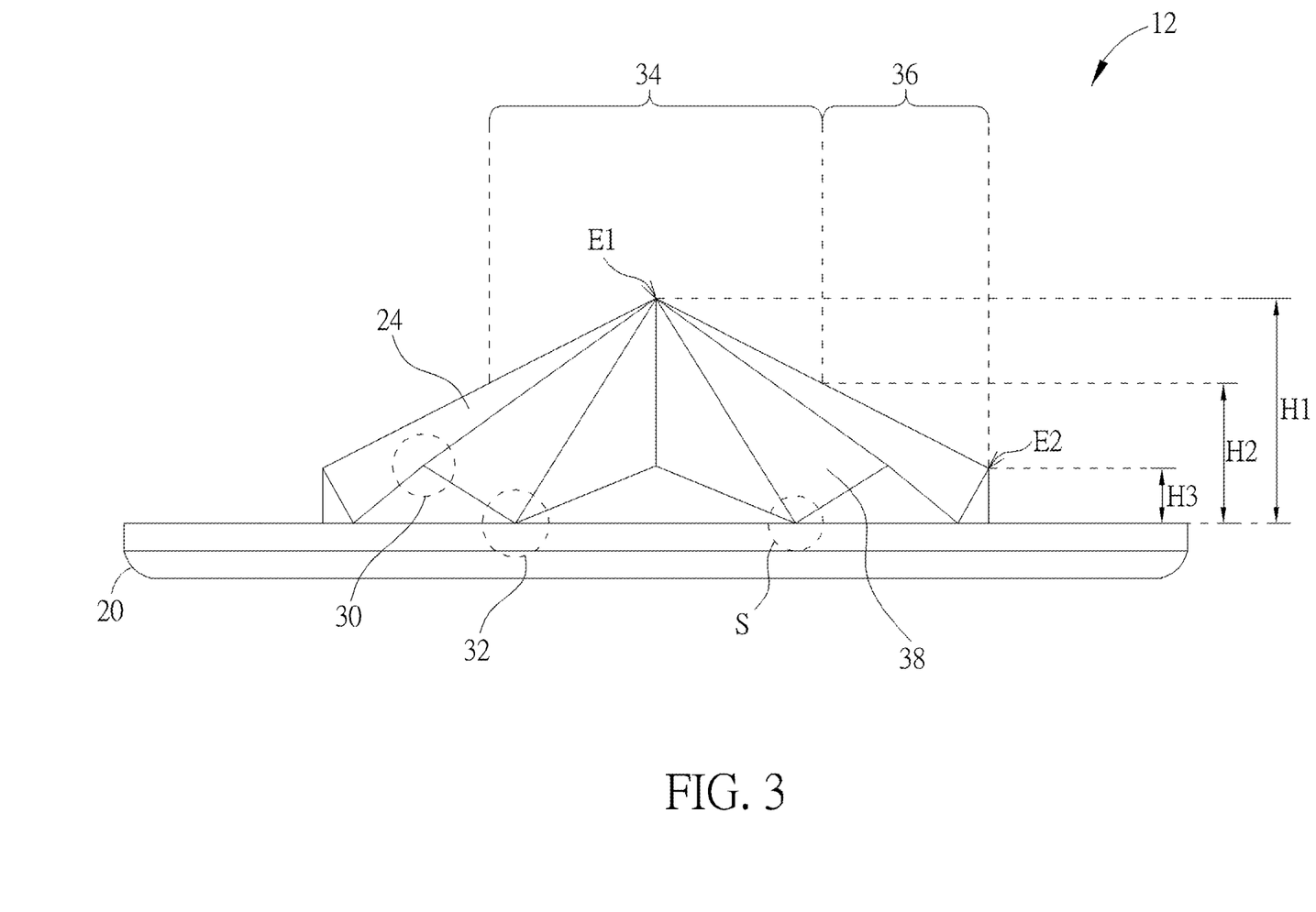
FIG. 3 is a structural side view of a part of the smoke collector according to the embodiment of the present invention.

Please refer to FIG. 3. FIG. 3 is a structural side view of a part of the smoke collector 12 according to the embodiment of the present invention. The base portion 24 of the smoke collector 12 can further include a central region 34 and an outer region 36, and the outer region 36 can be disposed around the central region 34. A center structural height H1 of the central region 34 can be greater than an edge structural height H2 of the central region 34 of the base portion 24, and a minimal structural height of the central region 34 relative to the shelter 20 can be the same as a maximal structural height of the outer region 36 relative to the shelter 20, so that an outer surface of the base portion 24 can be defined as the continuous slope.

Figure 11:
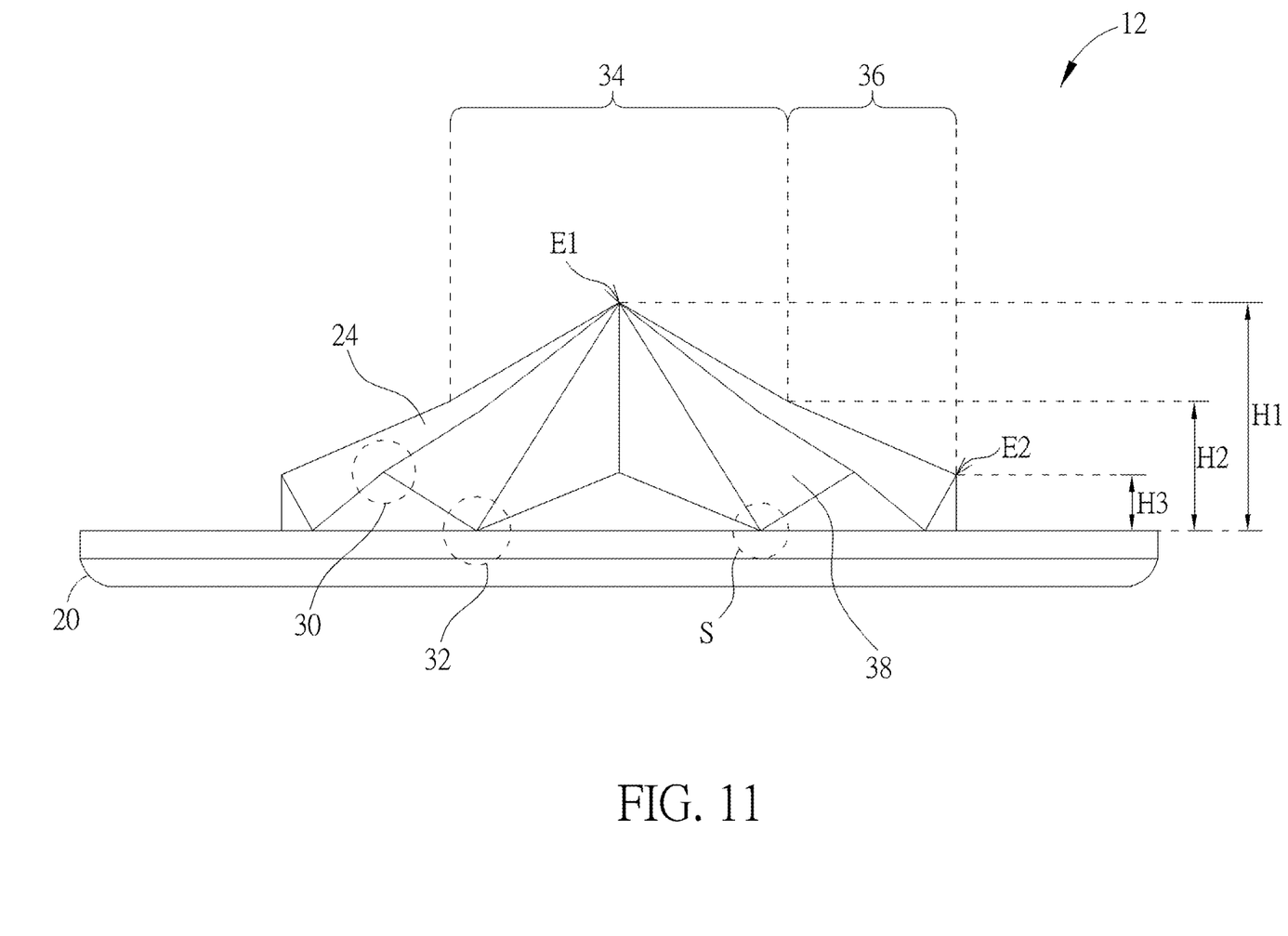
FIG. 11 is a structural side view of a part of the smoke collector according to another embodiment of the present invention.

Please refer to FIG. 11. FIG. 11 is a structural side view of a part of the smoke collector 12 according to another embodiment of the present invention. The outer surface of the base portion 24 in this embodiment can be the non-continuous slope, which means an included angle feature may be formed between the central region 34 and the outer region 36; a shape of position of the included angle feature are not limited to the embodiment shown in FIG. 11, and depend on the design demand.

In the present invention, the base portion 24 can be indicated as a structure with undulating surfaces, such as the close-loop structure stitched by multiple valley-shaped features, and used to accurately control the reflection direction of the illumination beam, instead of reflecting the illumination beam all towards a direction away from the optical detector 18. That is to say, the base portion 24 of the smoke collector 12 can utilize the protruding structure 30 and the sunken structure 32 to reflect a known part of the illumination beam towards the direction away from the optical detector 18, and further keep a specific part of the illumination beam being received by the optical detector 18 for retaining the certain background value; therefore, the optical detector 18 can receive the scattered illumination beam with higher intensity and not easily interfered by ambient light outside the smoke detection device 10, and the smoke detection device 10 can have preferred detection accuracy and detection stability.

As shown in FIG. 3, each protruding structure 30 can have a first end E1 and a second end E2 opposite to each other. The first end E1 can be located on the central region 34, and the second end E2 can be located on the outer region 36. A first structural height (which may be equal to the center structural height H1) of the first end E1 relative to the shelter 20 can be greater than a second structural height H3 of the second end E2 relative to the shelter 20, and the base portion 24 with the protruding structure 30 can be similar to the close-loop structure stitched by the multiple valley-shaped features. Accordingly, the sunken structure 32 can have the first end E1 and the second end E2 opposite to each other and further a reflection surface 38. The protruding structures 30 and the sunken structures 32 can be connected with each other via the reflection surface 38 to form the foresaid close-loop structure with the multiple valley-shaped features, so as to process (such as reflect) the illumination beam from all orientations. The reflection surface 38 can be located between the first end E1 and the second end E2. It should be mentioned that the first end E1 and the second end E2 may be shared by the protruding structure 30 and the sunken structure 32. Each sunken structure 32 can be located between two protruding structures 30, and the base portion 24 with the protruding structure 30 and the sunken structure 32 can be similar to the close-loop structure stitched by the multiple valley-shaped features.

The base portion 24 can utilize the reflection surface 38 to control the reflection direction of the illumination beam. In this embodiment, the reflection surface 38 can be two flat surfaces bent to each other, and be extended from the first end E1 to the second end E2. As shown in FIG. 3, a section S of the reflection surface 38 related to the second end E2 can contact the shelter 20. Therefore, the smoke detection device 10 can design a surface structural feature (such as the two flat surfaces bent to each other as mentioned above), an extended length (such as a distance between the first end E1 and the second end E2) and an extended angle (such as a slope from the first end E1 extended towards and contacting the shelter 20) of the reflection surface 38 in accordance with an actual demand, so as to control the reflection direction of the illumination beam.

Figure 4:
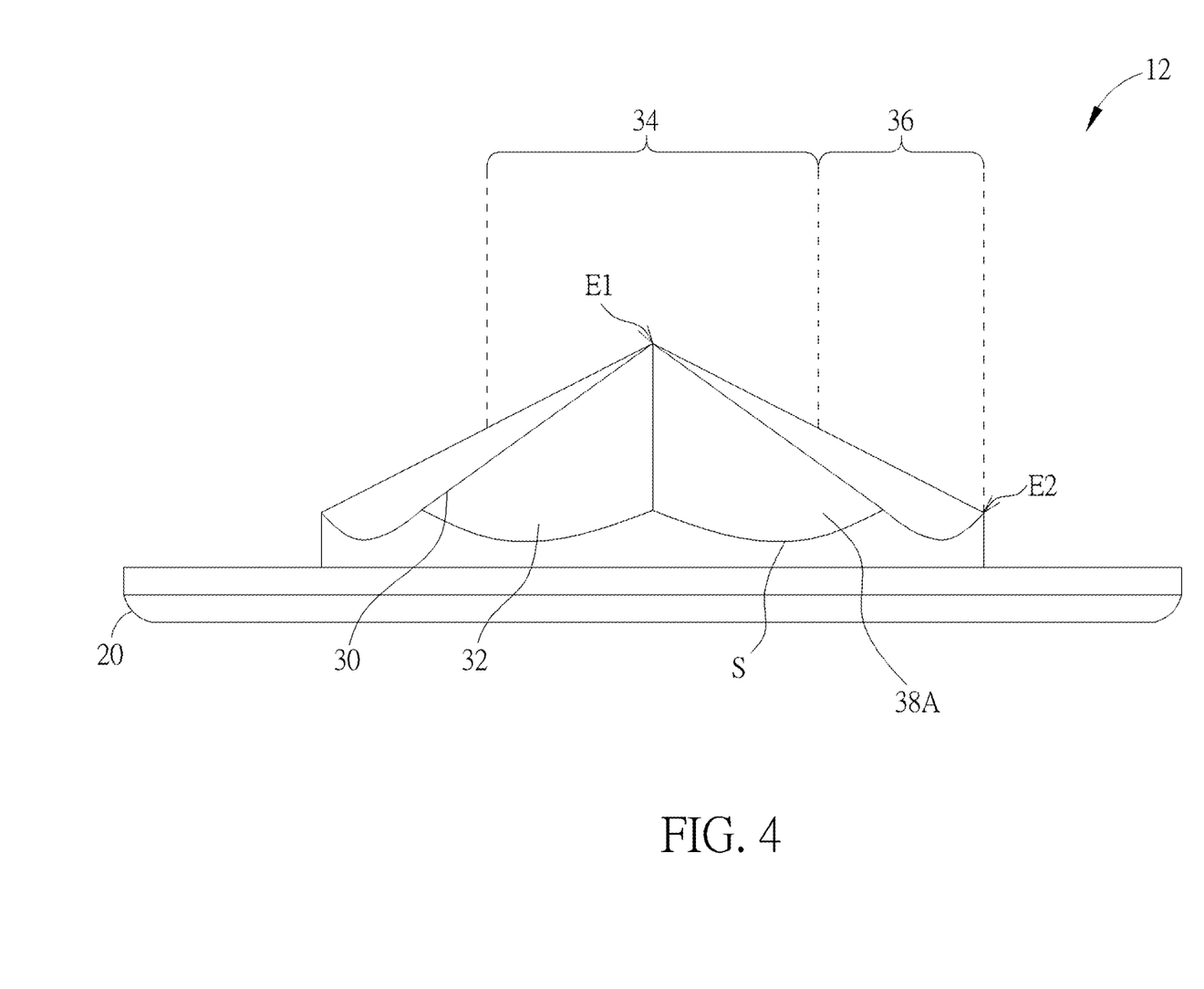
FIG. 4 to FIG. 6 are structural side views of a part of the smoke collector according to different embodiments of the present invention.
Figure 5:
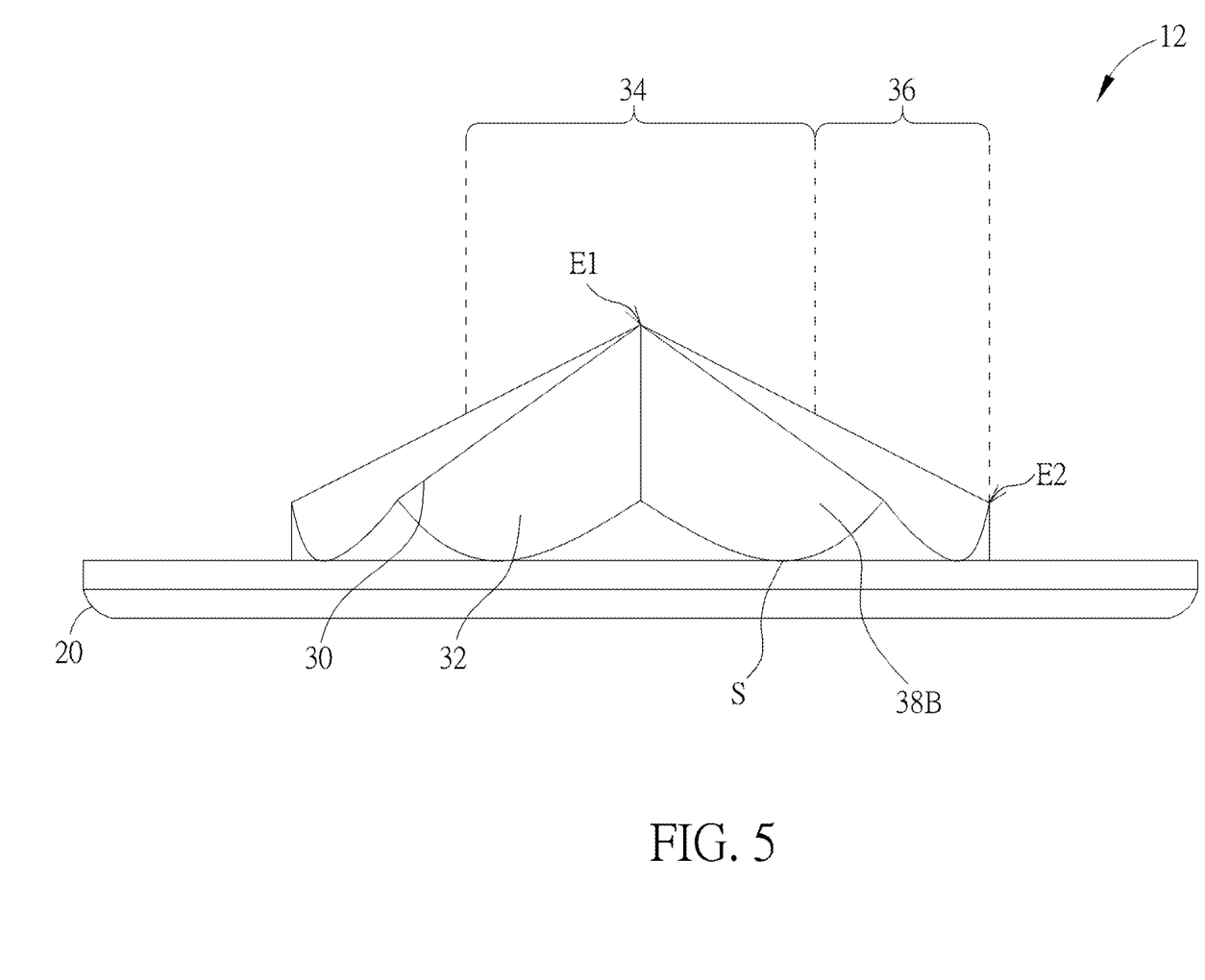
Figure 6:
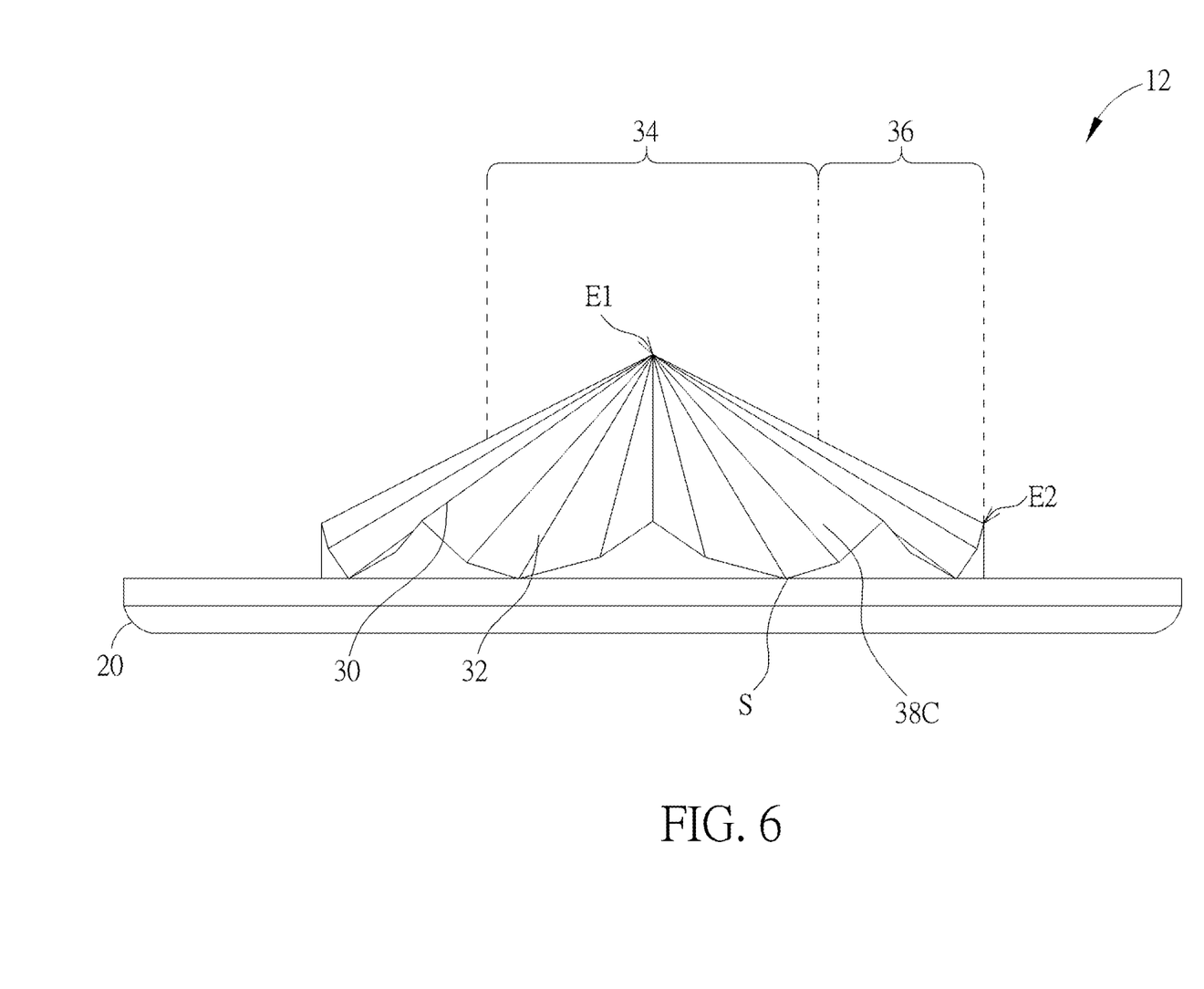

The reflection surface 38 may be interpreted as a connection surface between the protruding structure 30 and the sunken structure 32 that are adjacent to each other. As the embodiment shown in FIG. 3, the connection surface between the protruding structure 30 and the related sunken structure 32 can belong to the same flat surface, and practical application of the connection surface is not limited to the foresaid embodiment. Please refer to FIG. 4 to FIG. 6. FIG. 4 to FIG. 6 are structural side views of a part of the smoke collector 12 according to different embodiments of the present invention. In this embodiment, elements having the same numerals as ones of the foresaid embodiment can have the same structures and functions, and a detailed description is omitted herein for simplicity. As the embodiment shown in FIG. 4, the section S of the reflection surface 38A related to the second end E2 can be distant from the shelter 20, and the extended angle of the reflection surface 38 can be varied due to design change as mentioned above for controlling the reflection direction of the illumination beam. As the embodiment shown in FIG. 5, the reflection surface 38B can be an arc surface; as the embodiment shown in FIG. 6, the reflection surface 38C can be two flat surfaces bent to each other. The embodiments shown in FIGS. 4-6 can also control the reflection direction of the illumination beam by slope design of the reflection surface.

Figure 7:
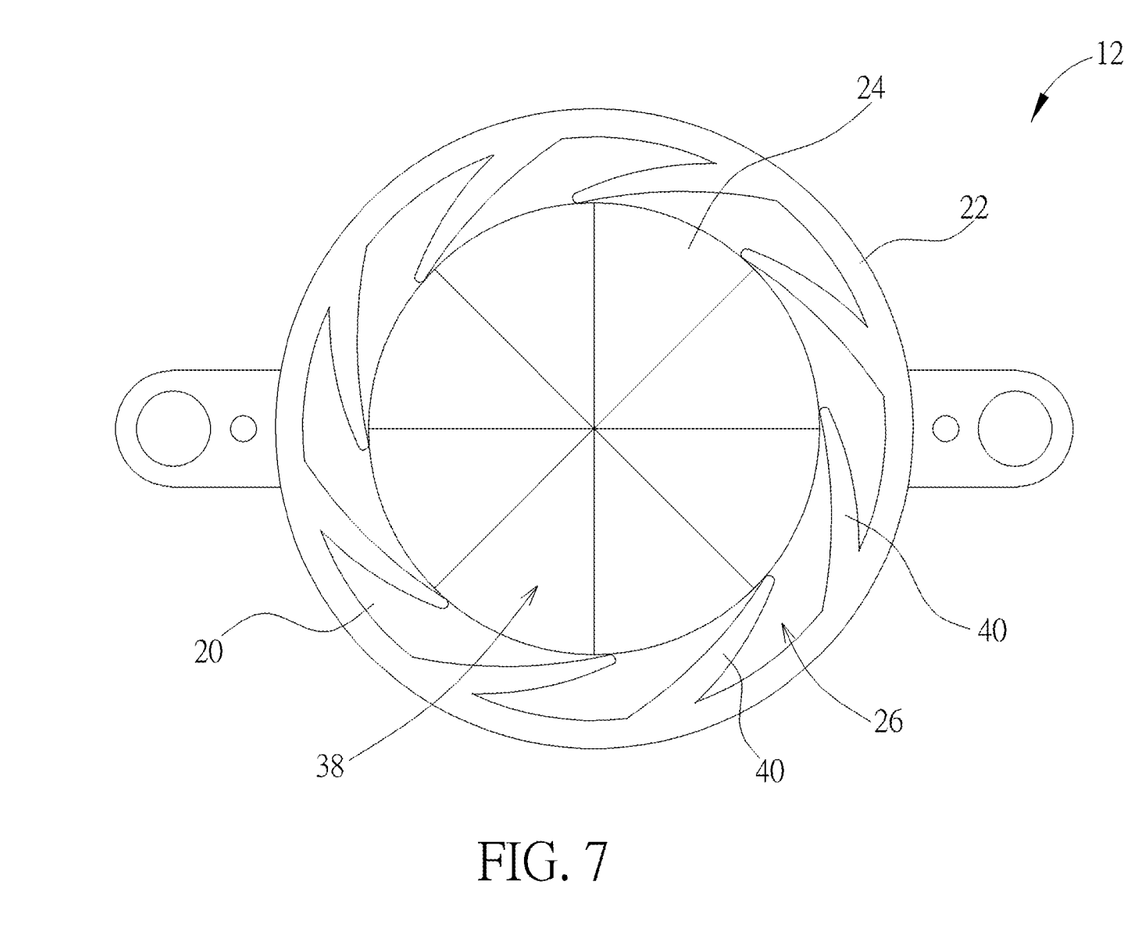
FIG. 7 is a top view of the smoke collector according to one embodiment of the present invention.
Figure 8:
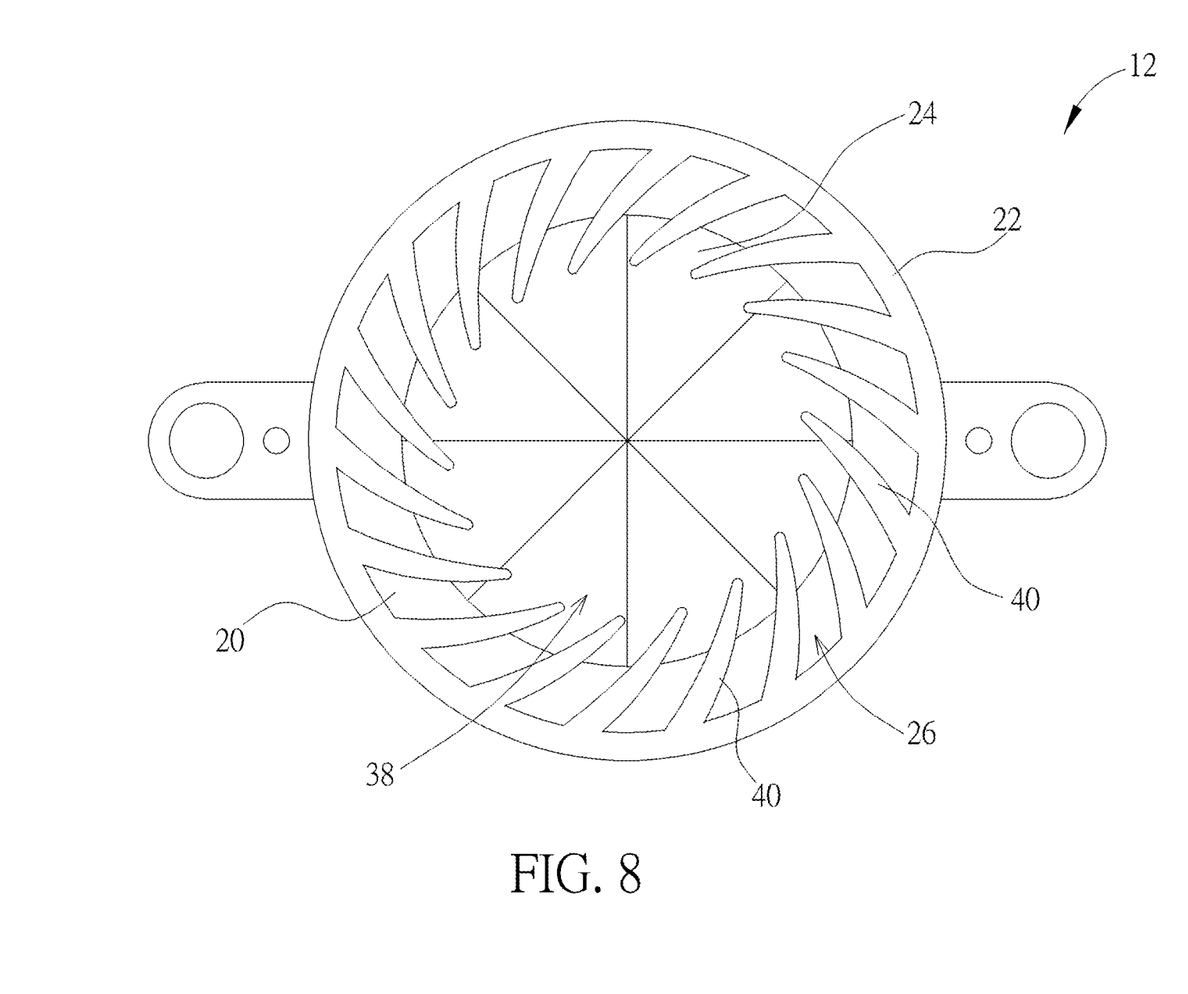
FIG. 8 is a top view of the smoke collector according to another embodiment of the present invention.

Please refer to FIG. 1, FIG. 2, FIG. 7 and FIG. 8. FIG. 7 and FIG. 8 are top views of the smoke collector 12 according to different embodiments of the present invention. The lateral portion 22 can include a plurality of guiding elements 40 disposed near by the opening 26. The plurality of guiding elements 40 can be disposed around the base portion 24 in a spaced manner. The guiding element 40 may be optionally designed as wing-shaped structure, and used to increase flow of the gaseous matter passing through the smoke collector 12. As the embodiment shown in FIG. 7, the guiding element 40 can be disposed on the shelter 20 and not overlapped with the base portion 24; as the embodiment shown in FIG. 8, the guiding element 40 can be extended from the shelter 20 to position above the base portion 24, and may be used to concentrate the gaseous matter entering the smoke collector 12 near the reflection surface 38 of the base portion 24.

Figure 9:
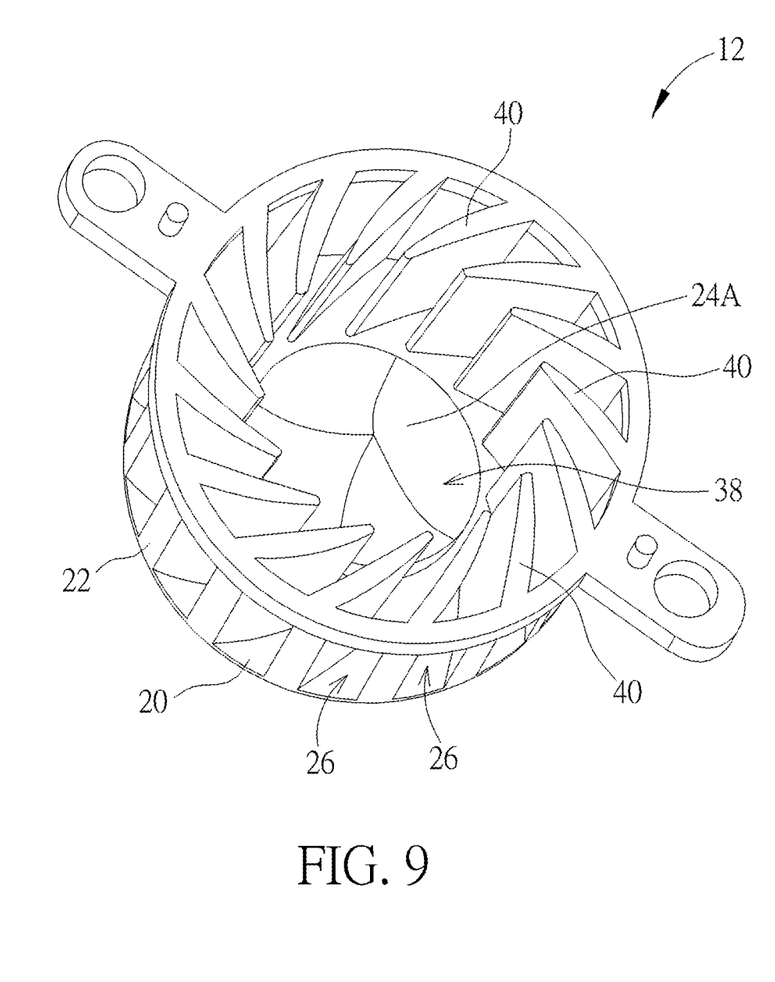
FIG. 9 and FIG. 10 are diagrams of some part of the smoke collector according to other possible embodiments of the present invention.
Figure 10:
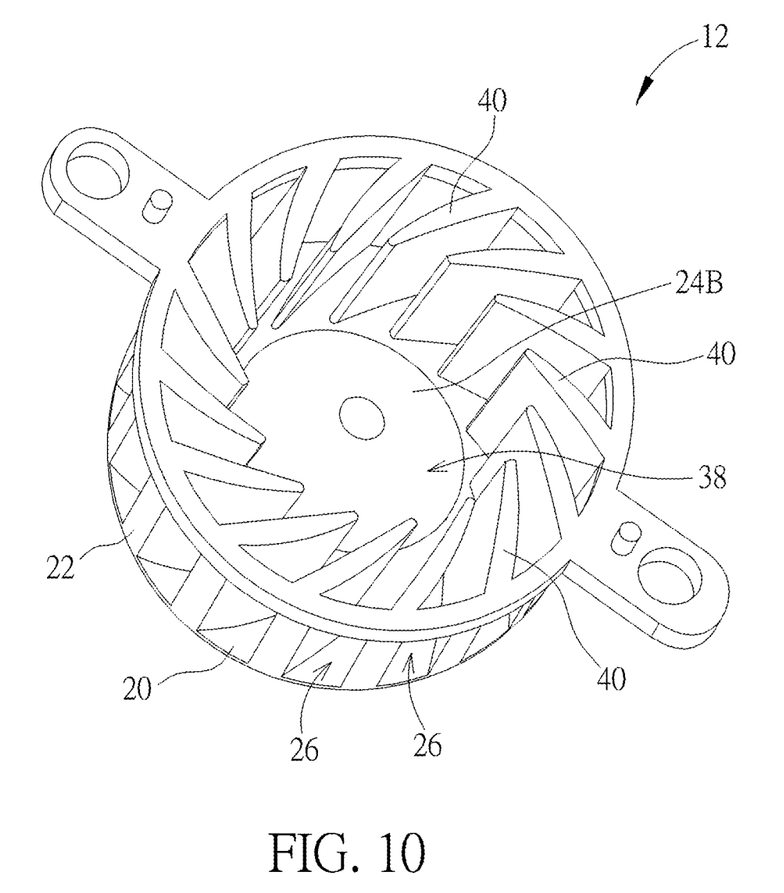

Please refer to FIG. 9 and FIG. 10. FIG. 9 and FIG. 10 are diagrams of some part of the smoke collector 12 according to other possible embodiments of the present invention. In the embodiment, elements having the same numerals as ones of the foresaid embodiment can have the same structures and functions, and the detailed description is omitted herein for simplicity. As shown in FIG. 9, the base portion 24A of the smoke collector 12 can be shaped like a pyramid structure, and the reflection surface 38 (which can be interpreted as the connection surface between the protruding structure 30 and the sunken structure 32) of the base portion 24A can be the flat surface or the arc surface. As shown in FIG. 10, the base portion 24B of the smoke collector 12 can be the only embodiment of the present invention with the smooth conical structure, and top of the smooth conical structure may be cut off to create a concave space, and the reflection surface 38 of the base portion 24B can be a smooth surface.

Figure 12:
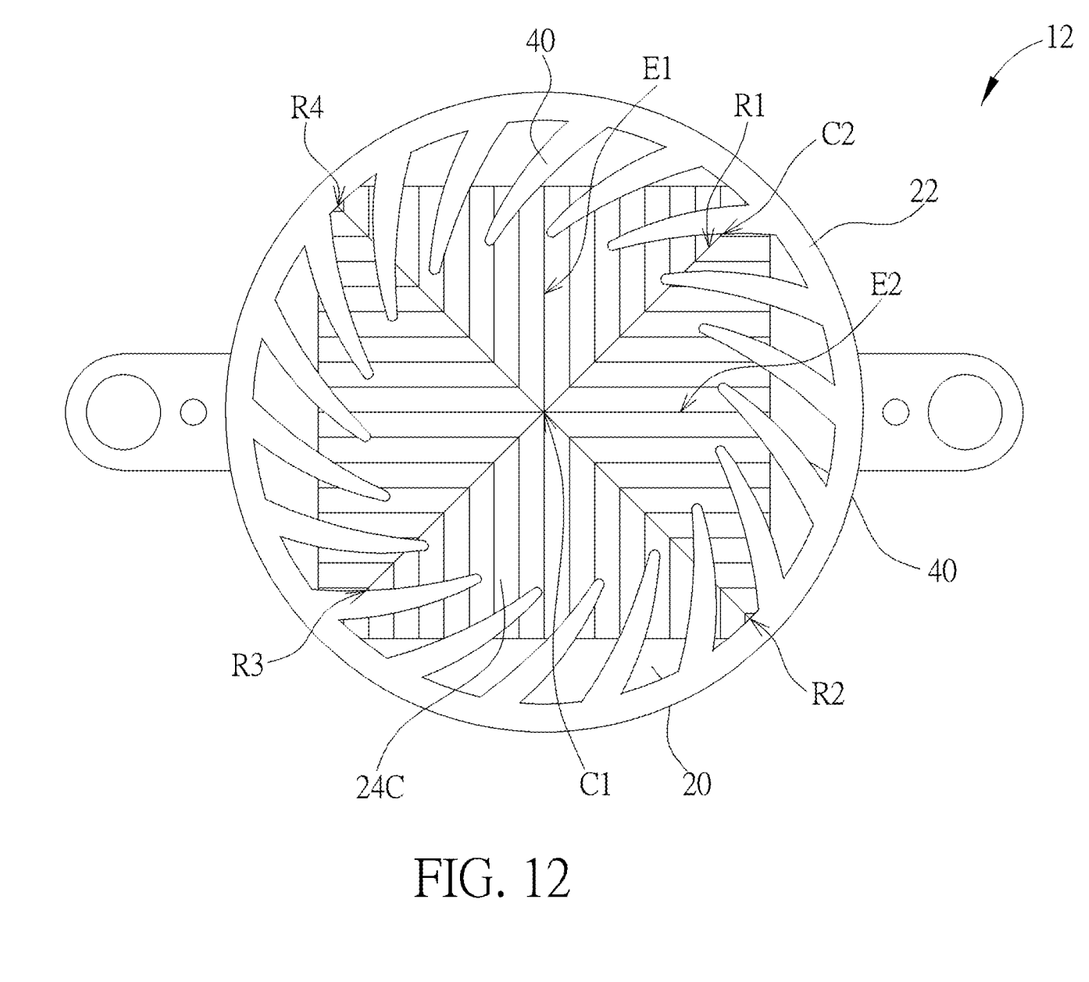
FIG. 12 is a diagram of some part of the smoke collector according to another possible embodiment of the present invention.

Please refer to FIG. 12. FIG. 12 is a diagram of some part of the smoke collector 12 according to another possible embodiment of the present invention. In the embodiment, elements having the same numerals as ones of the foresaid embodiment can have the same structures and functions, and the detailed description is omitted herein for simplicity. As shown in FIG. 12, the base portion 24C of the smoke collector 12 can include some regions R1, R2, R3 and R4. The diagonal line of each region (such as the region R1) can have a slope from high to low between the center point C1 and the corner point C2. The edges E1 and E2 extended from the center point C1 of each region can have a structural height the same or similar to a structural height of the center point C1. The structural height of the edges E1 and E2 relative to the shelter 20 can be greater than a structural height of the corner point C2 relative to the shelter 20.

In conclusion, the smoke detection device of the present invention can design the guiding element into the streamlined wing-shaped structure for increasing the flow of the gaseous matter in and out of the smoke collector; the smoke detection device can further dispose the base portion similar to the close-loop structure stitched by the multiple valley-shaped features on the shelter of the smoke collector, and the base portion can have the protruding structures and the sunken structures alternately and symmetrically disposed adjacent to each other that can control the reflection direction of the illumination beam emitted by the illumination light source; for example, some part of the illumination beam can be reflected in the direction away from the optical detector to be out of the smoke collector, and a specific part of the illumination beam may be stilled received by the optical detector. The connection surface between the protruding structure and the corresponding sunken structure can be indicated as the reflection surface of the base portion. The present invention define the surface structural feature, the extended length and/or the extended angle of the reflection surface to accurately control a reflection amount of the illumination beam in different reflection directions. Comparing to the prior art, the smoke detection device of the present invention can allow the optical detector to receive the illumination beam with higher intensity scattered from the gaseous matter without influence of reflected light from the base portion inside the smoke collector; even though the optical detector detects the ambient light, a detection result of the optical detector is slightly effected by the ambient light because the scattered illumination beam is larger than the ambient light, and the optical detector can still provide the preferred detection accuracy.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A smoke detection device, comprising:
   a circuit board;
   an illumination light source disposed on the circuit board and adapted to emit an illumination beam;
   an optical detector disposed adjacent to the illumination light source and adapted to receive the illumination beam; and
   a smoke collector disposed on the circuit board to cover the illumination light source and the optical detector, the smoke collector comprising:
   a shelter;
   a lateral portion disposed on an edge of the shelter; and
   a base portion disposed on the shelter and surrounded by the lateral portion to form a collection chamber, the base portion comprising a plurality of protruding structures and a plurality of sunken structures alternately disposed adjacent to each other, each of the plurality of protruding structures and a corresponding sunken structure being adapted to control a reflection direction of the illumination beam, for reflecting a part of the illumination beam away from the optical detector and keeping a specific part of the illumination beam being received by the optical detector.

2. The smoke detection device of claim 1, wherein the base portion further comprises a central region and an outer region, the outer region is disposed around the central region, a center structural height of the central region is greater than edge structural height of the central region, and a minimal structural height of the central region relative to the shelter is the same as a maximal structural height of the outer region relative to the shelter.

3. The smoke detection device of claim 2, wherein each protruding structure comprises a first end and a second end opposite to each other, the first end is located inside the central region, the second end is located inside the outer region, a first structural height of the first end relative to the shelter is greater than a second structural height of the second end relative to the shelter.

4. The smoke detection device of claim 1, wherein each sunken structure comprises a first end and a second end opposite to each other and a reflection surface, the reflection surface is extended from the first end to the second end, a section of the reflection surface related to the second end contacts the shelter or is distant from the shelter.

5. The smoke detection device of claim 4, wherein the reflection surface is an arc surface, or two flat surfaces bent to each other.

6. The smoke detection device of claim 1, wherein a connection surface between the protruding structure and the corresponding sunken structure is a flat surface, an arc surface, or two flat surfaces bent to each other.

7. The smoke detection device of claim 1, wherein the base portion is a circular structure.

8. The smoke detection device of claim 1, wherein the lateral portion comprises a plurality of guiding elements disposed around the base portion in a spaced manner.

9. The smoke detection device of claim 8, wherein the plurality of guiding elements is a wing-shaped structure.

10. The smoke detection device of claim 8, wherein the plurality of guiding elements is disposed on the shelter, or is extended from the shelter to the base portion.

11. A smoke collector applied to a smoke detection device, the smoke collector comprising:
    a shelter;
    a lateral portion disposed on an edge of the shelter; and
    a base portion disposed on the shelter and surrounded by the lateral portion to form a collection chamber, the base portion comprising a plurality of protruding structures and a plurality of sunken structures alternately disposed adjacent to each other, each of the plurality of protruding structures and a corresponding sunken structure being adapted to control a reflection direction of an illumination beam emitted by the smoke detection device, for reflecting a part of the illumination beam away from an optical detector of the smoke detection device and keeping a specific part of the illumination beam being received by the optical detector.

12. The smoke collector of claim 11, wherein the base portion further comprises a central region and an outer region, the outer region is disposed around the central region, a center structural height of the central region is greater than edge structural height of the central region, and a minimal structural height of the central region relative to the shelter is the same as a maximal structural height of the outer region relative to the shelter.

13. The smoke collector of claim 12, wherein each protruding structure comprises a first end and a second end opposite to each other, the first end is located inside the central region, the second end is located inside the outer region, a first structural height of the first end relative to the shelter is greater than a second structural height of the second end relative to the shelter.

14. The smoke collector of claim 11, wherein each sunken structure comprises a first end and a second end opposite to each other and a reflection surface, the reflection surface is extended from the first end to the second end, a section of the reflection surface related to the second end contacts the shelter or is distant from the shelter.

15. The smoke collector of claim 14, wherein the reflection surface is an arc surface, or two flat surfaces bent to each other.

16. The smoke collector of claim 11, wherein a connection surface between the protruding structure and the corresponding sunken structure is a flat surface, an arc surface, or two flat surfaces bent to each other.

17. The smoke collector of claim 11, wherein the base portion is a circular structure.

18. The smoke collector of claim 11, wherein the lateral portion comprises a plurality of guiding elements disposed around the base portion in a spaced manner.

19. The smoke collector of claim 18, wherein the plurality of guiding elements is a wing-shaped structure.

20. The smoke collector of claim 18, wherein the plurality of guiding elements is disposed on the shelter, or is extended from the shelter to the base portion.

* * * * *